US009576430B2

(12) United States Patent
Acres

(10) Patent No.: US 9,576,430 B2
(45) Date of Patent: Feb. 21, 2017

(54) DELAYED BONUS WIN DETERMINATION

(71) Applicant: Patent Investment & Licensing Company, Las Vegas, NV (US)

(72) Inventor: John F. Acres, Las Vegas, NV (US)

(73) Assignee: PATENT INVESTMENT & LICENSING COMPANY, Las Vegas, NV (US)

( * ) Notice: Subject to any disclaimer, the term of this patent is extended or adjusted under 35 U.S.C. 154(b) by 0 days.

(21) Appl. No.: 15/199,381

(22) Filed: Jun. 30, 2016

(65) Prior Publication Data

US 2016/0314658 A1 Oct. 27, 2016

Related U.S. Application Data

(63) Continuation of application No. 14/755,196, filed on Jun. 30, 2015, now Pat. No. 9,406,199, which is a continuation of application No. 14/105,673, filed on Dec. 13, 2013, now Pat. No. 9,087,433, which is a continuation of application No. 12/816,309, filed on Jun. 15, 2010, now Pat. No. 8,608,554.

(60) Provisional application No. 61/187,975, filed on Jun. 17, 2009.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ......... *G07F 17/3258* (2013.01); *G07F 17/323* (2013.01); *G07F 17/3218* (2013.01); *G07F 17/3225* (2013.01); *G07F 17/3267* (2013.01)

(58) Field of Classification Search

CPC G07F 17/323; G07F 17/3218; G07F 17/3225; G07F 17/3227; G07F 17/3258

See application file for complete search history.

(56) References Cited

U.S. PATENT DOCUMENTS

| | | | |
|---|---|---|---|
| 4,199,147 | A | 4/1980 | Stansberry |
| 4,837,728 | A | 6/1989 | Barrie et al. |
| 5,401,024 | A | 3/1995 | Simunek |
| 5,411,271 | A | 5/1995 | Mirando |
| 5,564,700 | A | 10/1996 | Celona |
| 5,704,835 | A | 1/1998 | Dietz, II |
| 5,997,401 | A | 12/1999 | Crawford |
| 6,089,976 | A | 7/2000 | Schneider et al. |
| 6,149,156 | A | 11/2000 | Feola |
| 6,174,235 | B1 | 1/2001 | Walker et al. |
| 6,227,972 | B1 | 5/2001 | Walker et al. |
| 6,251,013 | B1 | 6/2001 | Bennett |
| 6,261,177 | B1 | 7/2001 | Bennett |
| 6,270,409 | B1 | 8/2001 | Shuster |
| 6,270,412 | B1 | 8/2001 | Crawford et al. |
| 6,309,300 | B1 | 10/2001 | Glavich |
| 6,346,043 | B1 | 2/2002 | Colin et al. |
| 6,347,996 | B1 | 2/2002 | Gilmore et al. |
| 6,379,245 | B2 | 4/2002 | De Keller |

(Continued)

*Primary Examiner* — Steven J Hylinski

(74) *Attorney, Agent, or Firm* — Marger Johnson

(57) ABSTRACT

Embodiments of the present invention are directed to gaming devices having a delayed bonus win determination and methods of operating gaming systems and gaming devices to provide delayed bonus win determinations. Here, contributions to a linked jackpot may be separated from the chance to win the linked jackpot, where the chance to win the linked jackpot can be stored and used at a later time.

17 Claims, 13 Drawing Sheets

(56) References Cited

U.S. PATENT DOCUMENTS

| | | | |
|---|---|---|---|
| 6,485,367 | B1 | 11/2002 | Joshi |
| 6,494,454 | B2 | 12/2002 | Adams |
| 6,506,118 | B1 | 1/2003 | Baerlocher et al. |
| 6,511,375 | B1 | 1/2003 | Kaminkow |
| 6,758,757 | B2 | 7/2004 | Luciano et al. |
| 6,800,027 | B2 | 10/2004 | Giobbi et al. |
| 6,855,054 | B2 | 2/2005 | White et al. |
| 7,063,617 | B2 | 6/2006 | Brosnan et al. |
| 7,182,689 | B2 | 2/2007 | Hughs-Baird et al. |
| 7,182,690 | B2 | 2/2007 | Giobbi et al. |
| 7,252,591 | B2 | 8/2007 | Van Asdale |
| 7,393,278 | B2 | 7/2008 | Gerson et al. |
| 7,445,548 | B1 | 11/2008 | Muskin |
| 7,458,889 | B2 | 12/2008 | Gauselmann |
| 7,585,223 | B2 | 9/2009 | Iddings et al. |
| 7,682,244 | B1 | 3/2010 | Luciano et al. |
| 7,684,874 | B2 | 3/2010 | Schlottmann et al. |
| 7,690,996 | B2 | 4/2010 | Iddings et al. |
| 7,785,188 | B2 | 8/2010 | Cannon |
| 7,811,167 | B2 | 10/2010 | Giobbi et al. |
| 7,892,081 | B2 | 2/2011 | Glavich et al. |
| 7,905,772 | B2 | 3/2011 | Baerlocher et al. |
| 7,963,847 | B2 | 6/2011 | Baerlocher |
| 7,967,676 | B2 | 6/2011 | Rodgers et al. |
| 8,187,082 | B2 | 5/2012 | Slomiany |
| 2003/0027628 | A1 | 2/2003 | Luciano |
| 2003/0045348 | A1 | 3/2003 | Palmer et al. |
| 2003/0109300 | A1 | 6/2003 | Walker et al. |
| 2004/0009803 | A1 | 1/2004 | Bennett et al. |
| 2004/0023714 | A1 | 2/2004 | Asdale |
| 2004/0087368 | A1 | 5/2004 | Gauselmann |
| 2004/0106448 | A1 | 6/2004 | Gauselmann |
| 2004/0235552 | A1 | 11/2004 | Gauselmann |
| 2005/0059471 | A1 | 3/2005 | Cannon |
| 2005/0059472 | A1 | 3/2005 | Joshi et al. |
| 2005/0239542 | A1 | 10/2005 | Olsen |
| 2006/0197279 | A1 | 9/2006 | Shimizu et al. |
| 2006/0205483 | A1 | 9/2006 | Meyer et al. |
| 2007/0026924 | A1 | 2/2007 | Taylor |
| 2008/0004534 | A1 | 1/2008 | Gelbart |
| 2008/0045344 | A1 | 2/2008 | Schlottmann et al. |
| 2008/0064481 | A1 | 3/2008 | Jackson et al. |
| 2008/0076532 | A1 | 3/2008 | Graham et al. |
| 2009/0111561 | A1 | 4/2009 | deWaal et al. |
| 2009/0176552 | A1 | 7/2009 | Hornik et al. |
| 2009/0233706 | A1* | 9/2009 | Yoshizawa .............. G07F 17/32 463/26 |
| 2009/0239630 | A1* | 9/2009 | Yoshizawa .......... G07F 17/3258 463/20 |
| 2009/0239654 | A1* | 9/2009 | Yoshizawa .......... G07F 17/3267 463/25 |

* cited by examiner

DELAYED BONUS WIN DETERMINATION

RELATED APPLICATIONS

This application is a continuation of U.S. Non-Provisional application Ser. No. 14/755,196, filed Jun. 30, 2015, which is a continuation of U.S. Non-Provisional application Ser. No. 14/105,673, filed Dec. 13, 2013, entitled "DELAYED BONUS WIN DETERMINATION," now U.S. Pat. No. 9,087,433, issued Jul. 21, 2015, which claims the benefit of priority to U.S. Non-Provisional application Ser. No. 12/816,309, filed Jun. 15, 2010, entitled "DELAYED BONUS WIN DETERMINATION," now U.S. Pat. No. 8,608,554, issued Dec. 17, 2013, which claims the benefit of priority to U.S. Provisional Patent Application No. 61/187,975, filed Jun. 17, 2009, entitled "LINKED JACKPOTS AND METHODS FOR AWARDING THEM," the contents of which are hereby incorporated by reference.

FIELD OF THE INVENTION

This disclosure relates generally to gaming devices, and more particularly to gaming devices having a delayed bonus win determination and methods of operating gaming systems and gaming devices to provide delayed bonus win determinations.

BACKGROUND

Game outcomes on gaming devices are typically determined at random where winning outcomes award a player money, credits, promotions, prizes, or other incentives, and losing outcomes typically result only in a lost wager. Player excitement is typically generated by providing the possibility of winning large awards for a relatively meager wager. Business principles require that most outcomes not be large winning outcomes for the player. However, this often times must be balanced with giving the player some incentive to keep playing. Therefore smaller valued winning outcomes are typically included in the game to drive up the hit frequency of winning outcomes while not awarding extremely large prizes too often.

Most multi-game jackpots utilize coin-in data to simultaneously drive up the amount of the jackpot award and to determine if the particular wager generating the coin-in data has met the triggering condition for the jackpot. That is, wagers made from gaming devices connected to the multi-game jackpot are typically used to fund the jackpot as well as determining if the jackpot is to be awarded to the wagering gaming device. A small percentage of the wager is generally added to the jackpot amount to continually drive up the jackpot amount. A multi-game jackpot may be connected to a bank or group of games, all games in a casino, or games in multiple casino properties. Naturally, the more games that are connected to the multi-game jackpot, the more quickly the jackpot amount will grow. Various methods may be used to determine when the jackpot is awarded. One common method is to randomly choose a triggering value from a large range of values and then determine when that value has been reached. For example, a coin-in value may be randomly selected as the triggering value in the range of 1 to 1 million. If the triggering value was randomly selected as 658,150, the 658,150th coin wagered on one of the connected gaming devices from the start of the bonus cycle would trigger the bonus to be awarded to the wagering game device. One issue with this award-selecting scheme, and other methods of determining when to award a multi-game jackpot, is that players often are not as willing to play the connected games when at the start of the bonus cycle. That is players know that the chance of winning the bonus again right after is has been awarded (i.e., at the start of new bonus cycle) is smaller than after the bonus has been built up for a while.

DETAILED DESCRIPTION

Figure 1A:
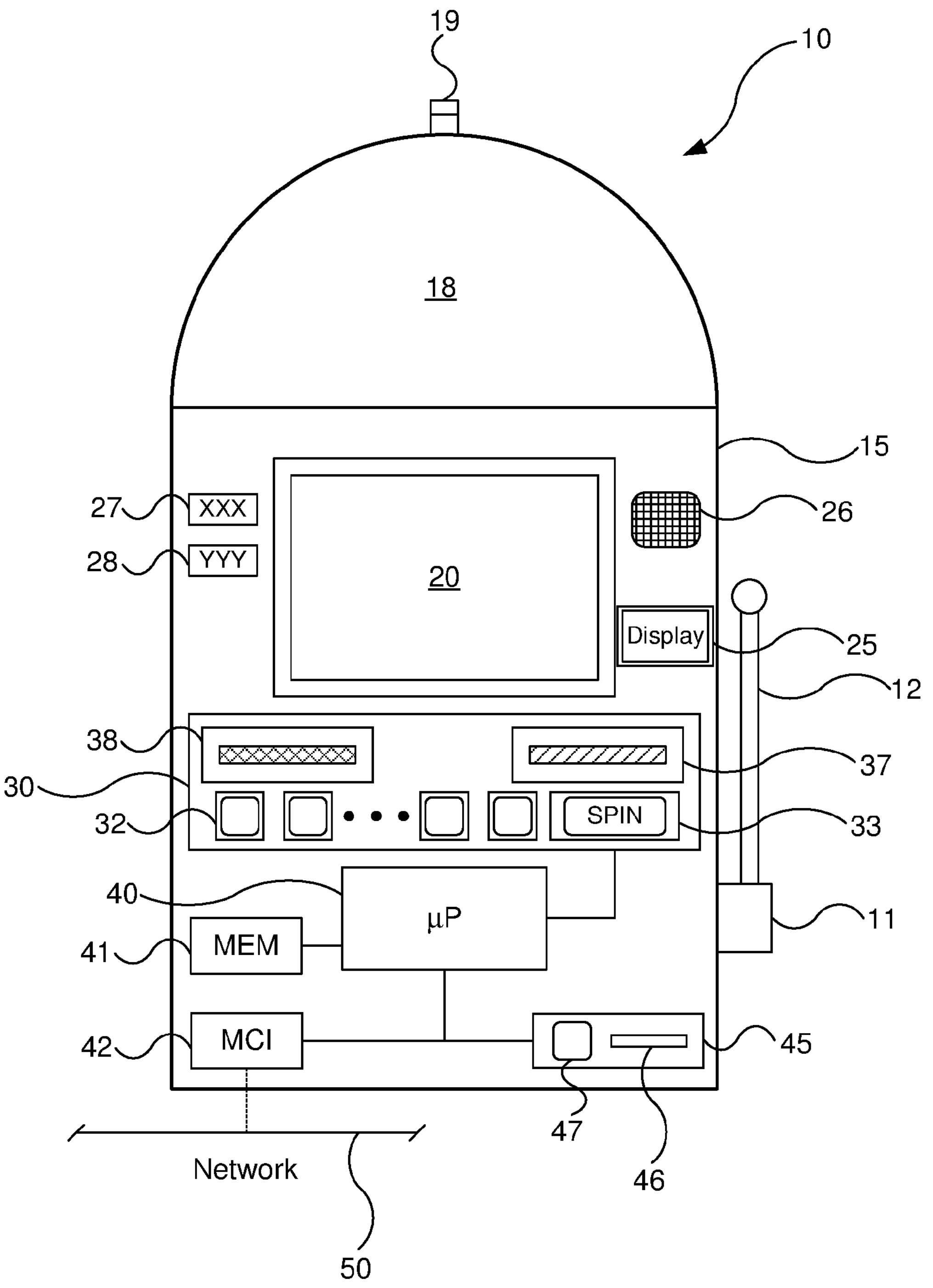
FIG. 1A is a functional block diagram that illustrates a gaming device according to embodiments of the invention.
Figure 1B:
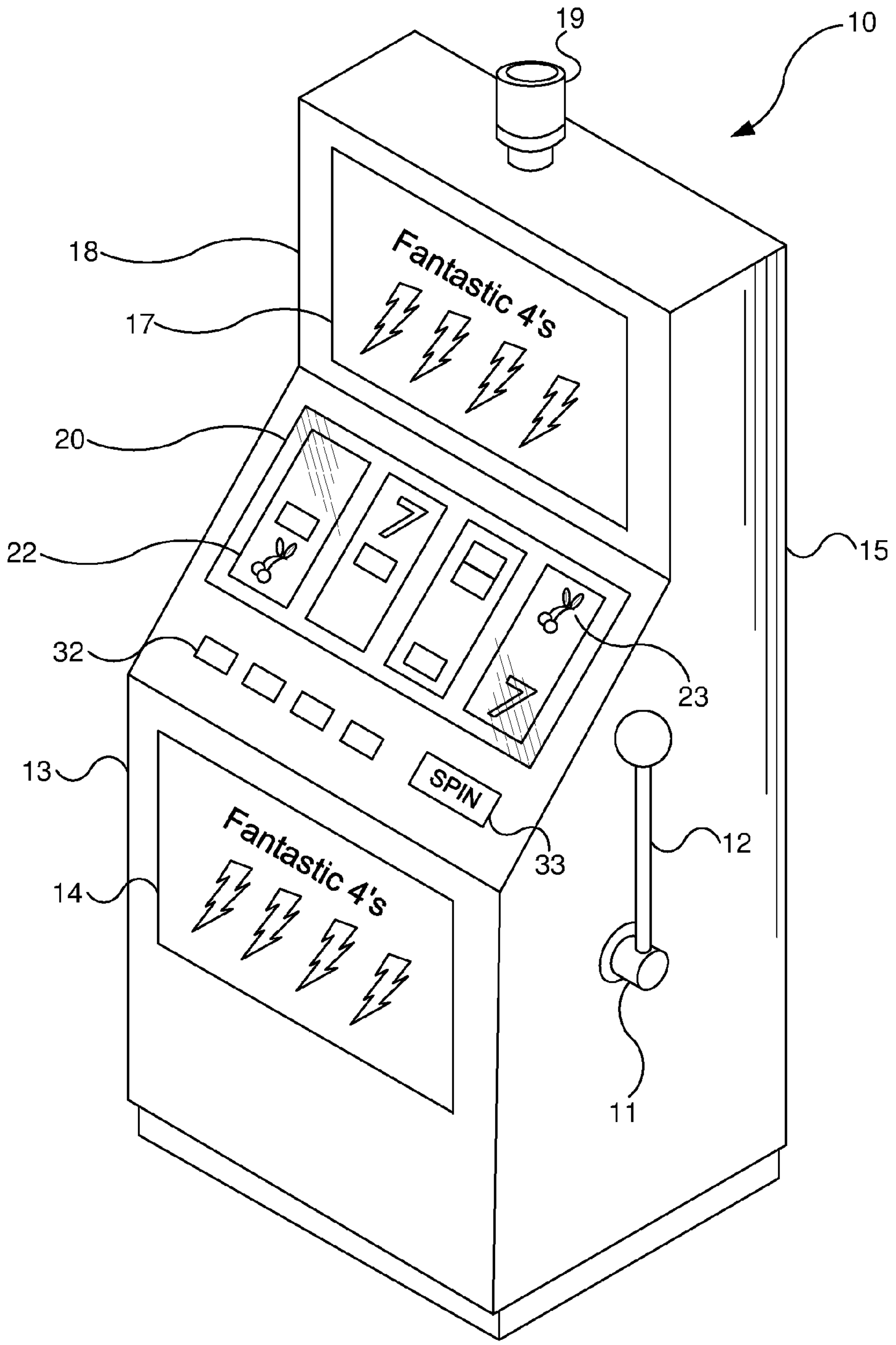
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window." Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

A player typically plays the gaming device 10 by placing a wager and activating an input mechanism to initiate a game associated with the placed wager. As used herein, a gaming event refers to any activity that affects the calculation or display of a game outcome. Game events include interactions occurring between the gaming device 10, the player, and/or a connected game system. Example gaming events include a player inserting a player account card in a gaming device, a double-pay bonus time period activation, a first spinning reel coming to a stop, a player's input to hold a card in a poker hand, etc. A game refers to the calculation and completion of one game outcome. That is, a game includes a single game cycle that begins with the initiation of the wagered upon game and ends with the completion of all activities relating to the wager placed including any intervening bonuses. In other words, a game encompasses all gaming events dependent on a placed wager during an initiated game including all amounts due the player that are paid directly by the gaming machine, or as a manual payment by casino personnel to the player playing that gaming machine. For example, if an item was awarded as a result of a wager that could be saved and used later, the game would encompass the awarding of the item, which is part of the game outcome, but not the later use of that item since the later use would affect a different game outcome. A game session refers to one or more played games. For example, a game session for a particular player may include each game played on a specific gaming device, each game played between insertions of money or credits, each game played between an initial money or credit insertion and a cash-out or zeroing out of credits, each game played during a casino stay, or each game played over a predetermined time period. Alternatively, game sessions may refer to games played by multiple players over a specified time period or event period with respect to a particular gaming device or group of gaming devices.

The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The game may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a game.

If the game does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
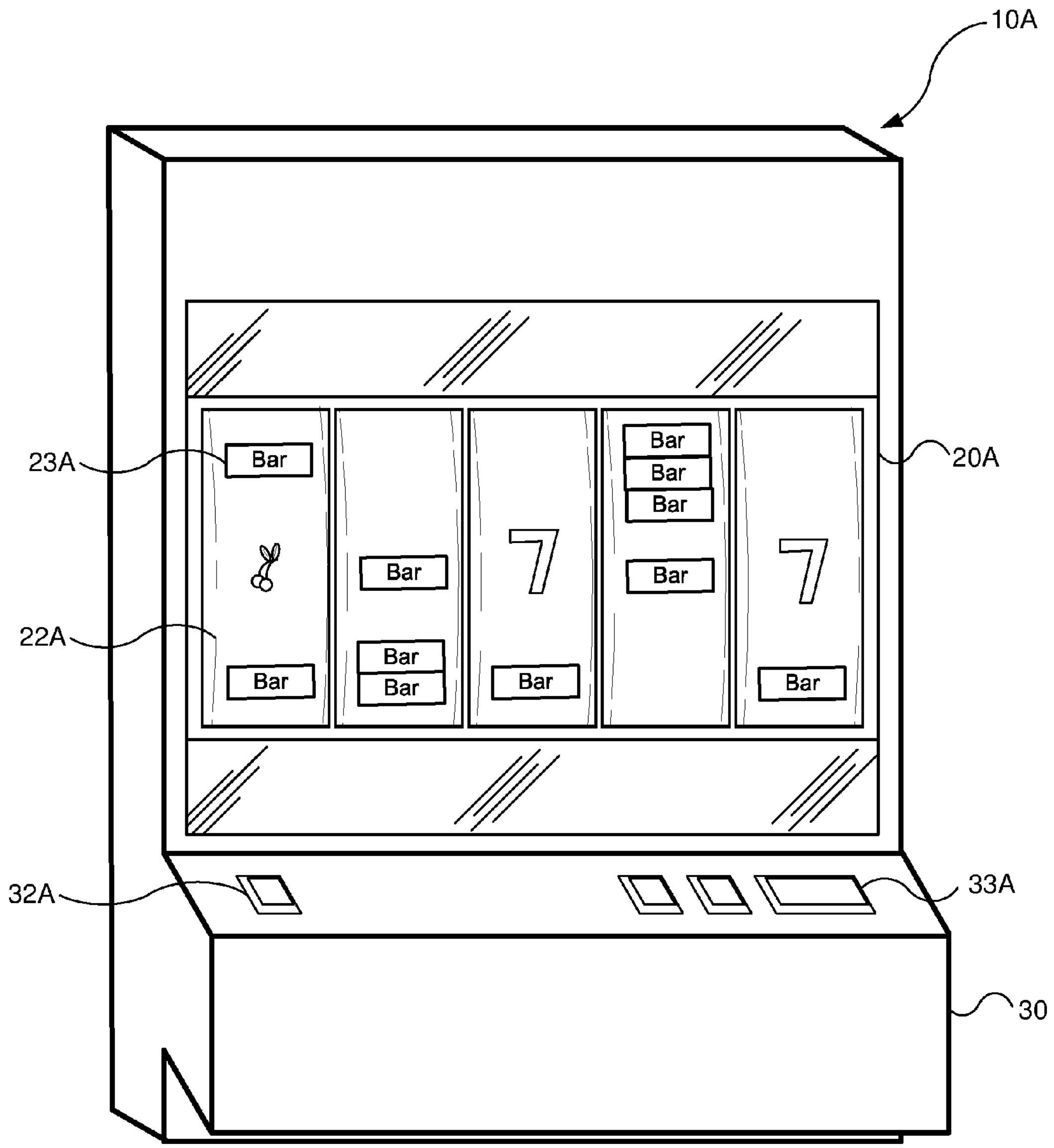
FIGS. 2A, 2B, and 2C are detail diagrams of exemplary types of gaming devices according to embodiments of the invention.
Figure 2B:
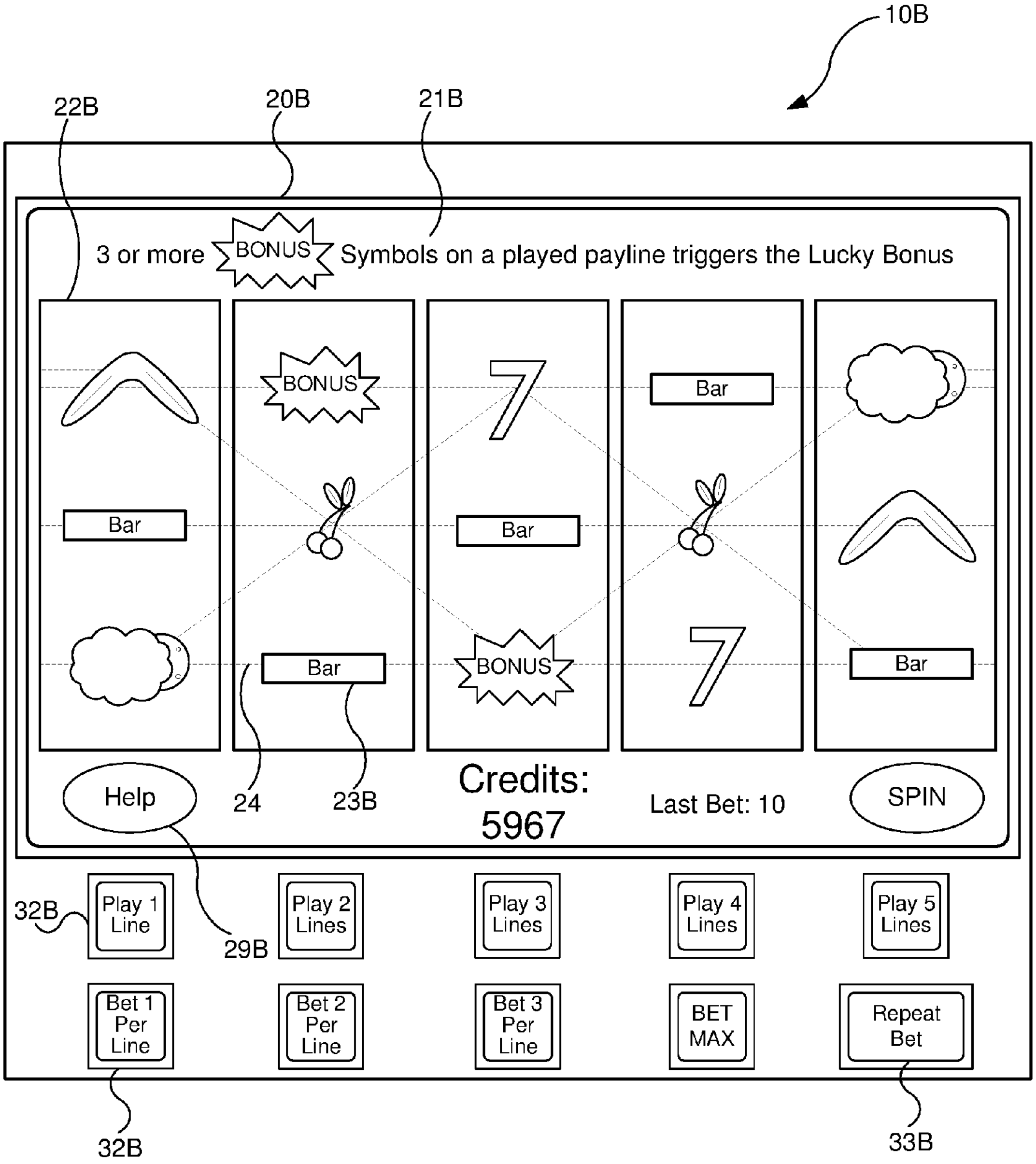
Figure 2C:
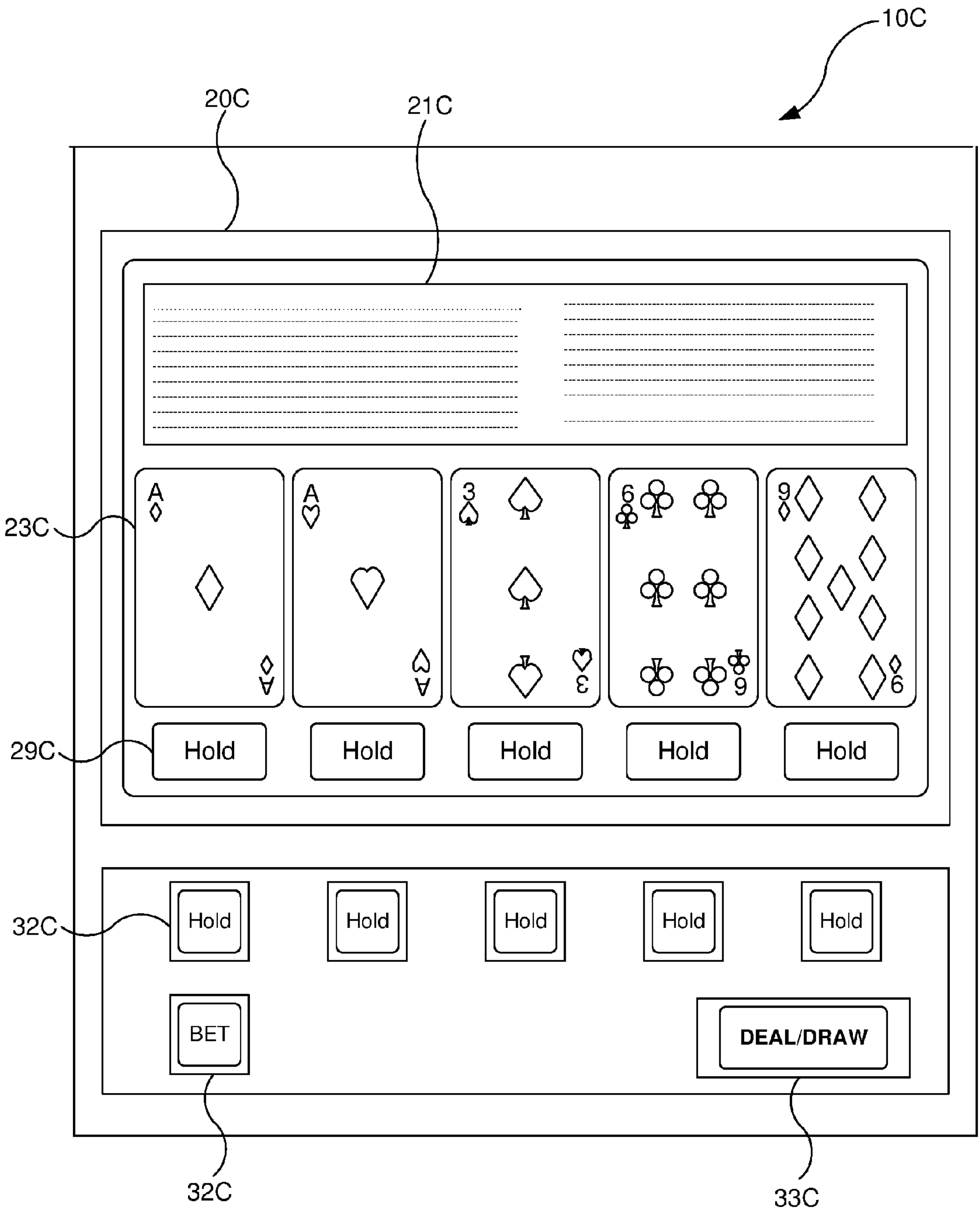

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty-two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A game on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the games. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the game ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five games, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a game. A repeat bet or spin button 33B may also be used to initiate each game when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a game after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
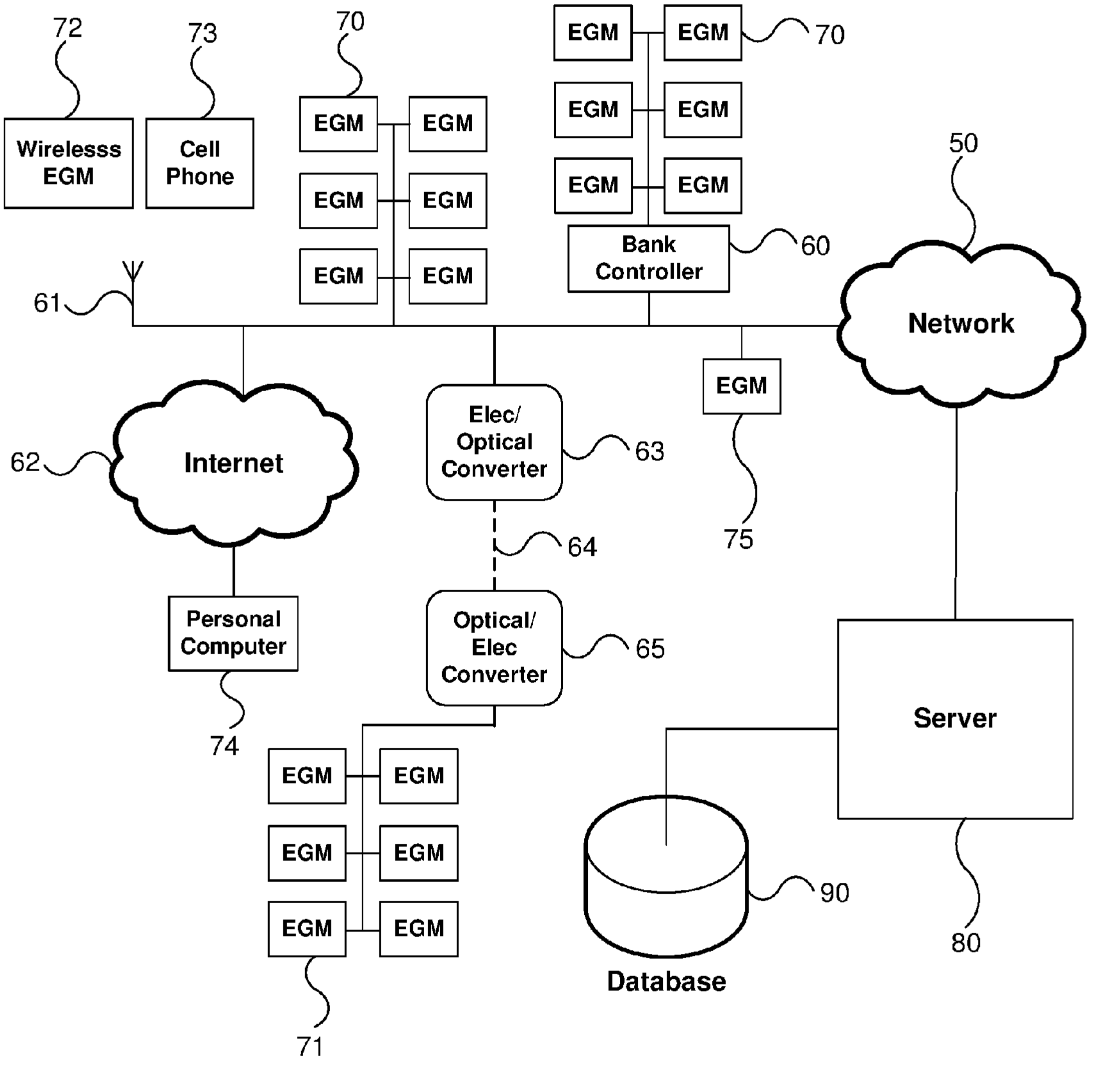
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

Some gaming systems may include a server 80 that is configured to provide account-based gaming. Account-based gaming systems uses concepts from player-tracking systems and cashless gaming systems to provide a money handling and wagering system that removes the need for any dedicated credit input or output devices at the gaming devices 70-75 themselves. That is, instead of using bill/ticket readers and ticket printers (or coin slots and coin hoppers) at gaming devices to input or redeem credits, players transfer money to a player credit account prior to gaming and then access his or her player credit account to place wagers at a gaming device 70-75. Winnings from game play at the gaming device are transferred back to the player credit account, from which the player can later withdraw money. In some embodiments, players at a gaming device 70-75 can "download" some or all of their available credits from their player credit account on the server 80 for wagering at the gaming device and then "upload" any remaining credits after game play to their player credit account. In other embodiments, wagers placed on the gaming devices 70-75 are automatically deducted from the player's player credit account and any awards are automatically added to the player credit account. These player credit account systems are especially useful for non-traditional gaming devices, such as wireless gaming devices 72, 73 and personal computers 74 since they do not typically include credit input or redemption mechanisms. However, their use in casinos with more traditional slot machines and video poker devices provides several advantages including a more seamless money handling system, improved game security, and potentially less expensive gaming devices.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

The gaming system shown in FIG. 3 may be used to provide a linked jackpot to the EGMs 70-75, or a portion of the connected gaming devices, through the network 50. As discussed above, one of the problems with linked jackpots that are eligible to be won by multiple gaming devices is that players may decide that they do not have as good of a chance to win a linked bonus during the early portions of a bonus cycle. That is, after a linked jackpot is won and the value of the linked jackpot is reset to an initial value, many players feel that another jackpot will not hit for a while. Thus, these players may choose to play other gaming devices rather than gaming devices connected to the linked jackpot, or to play the connected gaming devices at less than maximum play. This decision, in turn, means that the gaming devices connected to the linked jackpot may not be played to their full potential and the linked jackpot amount may increment at a slower rate due to the reduced game play. Another problem can happen at the other end of the spectrum for linked jackpots. That is, when a linked jackpot has grown to a large size and seems due to hit at any moment, all of the gaming devices connected to the linked jackpot may be occupied by gamblers while other players are forced to wait for an available machine to have a chance at winning the linked jackpot. Now instead of unused or under-used devices, there is supply limit for increased demand, which also results in a sub-optimum gaming scenario for both the players and the casino.

These issues are addressed by embodiments of this present concept, which provides gaming devices and gaming system that are configured to allow the win determination of the linked jackpot to be delayed during game play. During typical game play, a small portion of a player's wager (or coin-in) is allocated to the linked jackpot, where the linked jackpot amount grows proportionally to the allocation or contribution from the coin-in. At the same time, each time a qualifying game event is played, it is determined whether the triggering conditions for the linked jackpot has been satisfied. Embodiments of the invention separate these two actions so that the contribution from the game play still contributes to the linked jackpot, but the determination of whether the linked jackpot has been triggered by the game play can be stored away and used later. These determinations of whether a linked jackpot has been triggered are herein referred to as "win chances." Hence, when it is stated that a win chance is stored, it means that the determination of whether a linked jackpot has been triggered is not immediately performed at the time of a game event and that the saved determination can be made at a later time.

By allowing these win determinations or win chances to be separated from their associated game event (i.e., not immediately rendered during or immediately after the game event that led to their generation), embodiments of this concept allow players to determine when they feel like the linked jackpot is going to hit and to direct all of their chances at winning the linked jackpot from their game play at a chosen point. This provides the player with a sense of control, although it also involves a dose of risk. Storing win chances involves risk because if a bonus hits when a player has stored win chances, all of the stored win chances expire and become useless to the player. This makes the storing and use of win chances into a game within a game for players. While conservative players may simply choose to have their win chances used immediately when they are earned, more daring players may store up a sizable number of win chances and apply them all at once when they think the bonus might hit, or use portions of them periodically to increase their chances of winning the bonus at the later stages of a bonus cycle. Of course, if the bonus hits while they are still holding the win chances, they become useless and the player will never had even of had the chance to use them. However, that is the tradeoff. In some embodiments, some or all of the stored win chances may be carried over from one bonus cycle to another bonus cycle. However, the gaming system may require that these carried over win chances be used within a specified time or otherwise put restrictions on them.

These techniques work for linked jackpot bonuses that choose a number within a range as a winning number and then increment a bonus count or other bonus progress measuring metric until the bonus trigger value is reached, or for bonuses that randomly select a number and determine if the random number meets a triggering criterion. In the former type of bonus, the stored win chances simply do not increment the bonus count or progress metric. Once they are used, the bonus count or progress metric is incremented by the number of win chances used. If the bonus trigger value is reached during the use of the win chances, the player using the win chances wins the bonus. In the latter type of bonus, when win chances are used, a corresponding number of random numbers are selected and compared to the bonus trigger criterion to see if a match is made. If two or more players use win chances at the exact same time, or schedule win chances to be used at the identical time or bonus value, the win chances may be used for the earliest using player first (or a randomly chosen one of the players first), or the win chances of each player may be alternately used until they are all used (or the bonus is triggered). Variations in how these win chances may be chosen and allotted are discussed below with FIG. 8.

Although the embodiments discussed below reference a linked jackpot and a gaming system, other embodiments of this invention can be implemented on a stand alone gaming device having a jackpot that is based at least in part on contributions from game play. For example, these concepts could be implemented on a gaming device with a single game progressive jackpot. Here, win chance may be stored locally at the gaming device or stored remotely at a player database. Management of the win chances may also be controlled locally by a processor in the gaming device or controlled remotely by a bonus controller or server. In some embodiment, the management of the win chances may be controlled by the same device that controls the associated jackpot.

Figure 4A:
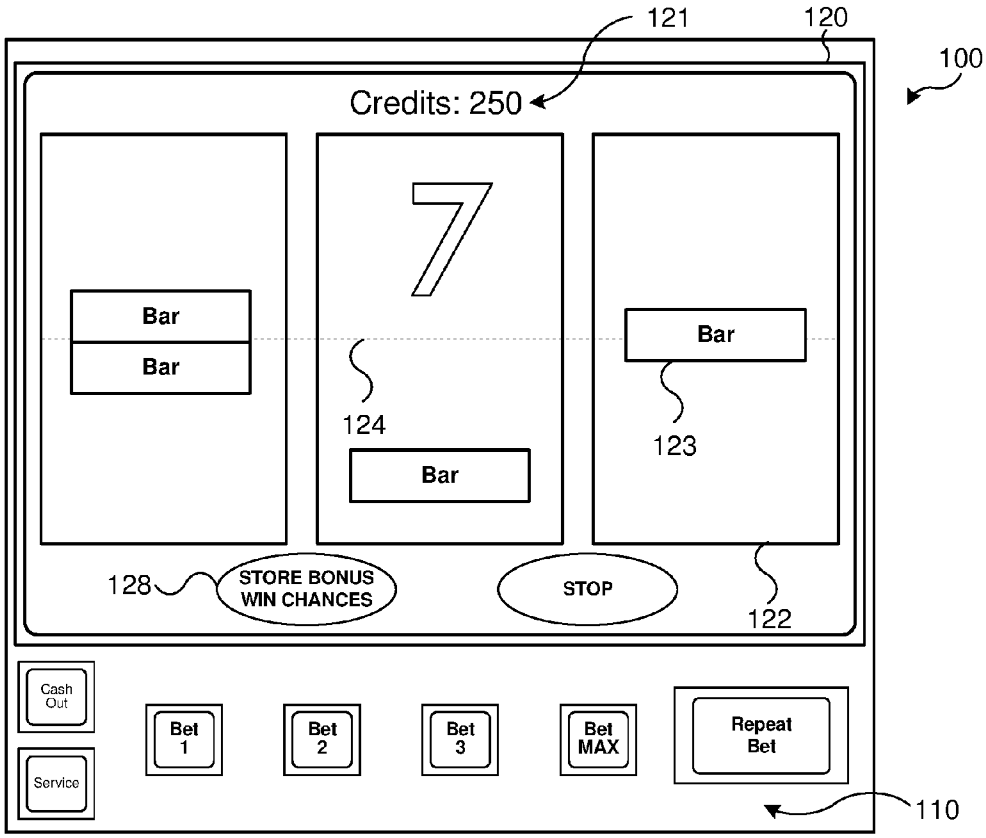
FIG. 4A is a detail diagram of a gaming device according to embodiments of the invention.

FIG. 4A is a detail diagram of a gaming device according to embodiments of the invention. Referring to FIG. 4A, a gaming device 100 includes a player interface panel 110 and a game display 120. The game display 120 is a video screen and depicts a video slot game having three spinning reels 122 where each spinning reel includes a plurality of game symbols 123. During a base game, the three reels 122 are spun and come to rest. If a combination of game symbols 123 recognized by the game paytable line up on a payline 124, the game device 100 pays an award associated with combination described in the paytable. A credit meter 121 keeps track of the number of credits that are available to a player to wager or cash-out. Here, the gaming display 120 also includes a soft button 128 that allows a player to store win chances. Although a three reel video slot machine is depicted in the embodiment shown in FIG. 4A, any type of gaming device may be implemented with the concepts described herein. Similarly, although a soft button 128 is shown as win chance storing input mechanism, a physical button on the player interface panel 110, an option in a help screen menu, or any other type of input configuration or mechanism may be used to access win chance storing options.

In this example embodiment, a player has inserted 250 credits into the gaming device 100, as shown on the credit meter 121. As the player does not feel that a linked jackpot (not shown) connected to the gaming device will hit in the immediate she considers saving her win chances for a use at a later date.

Figure 4B:
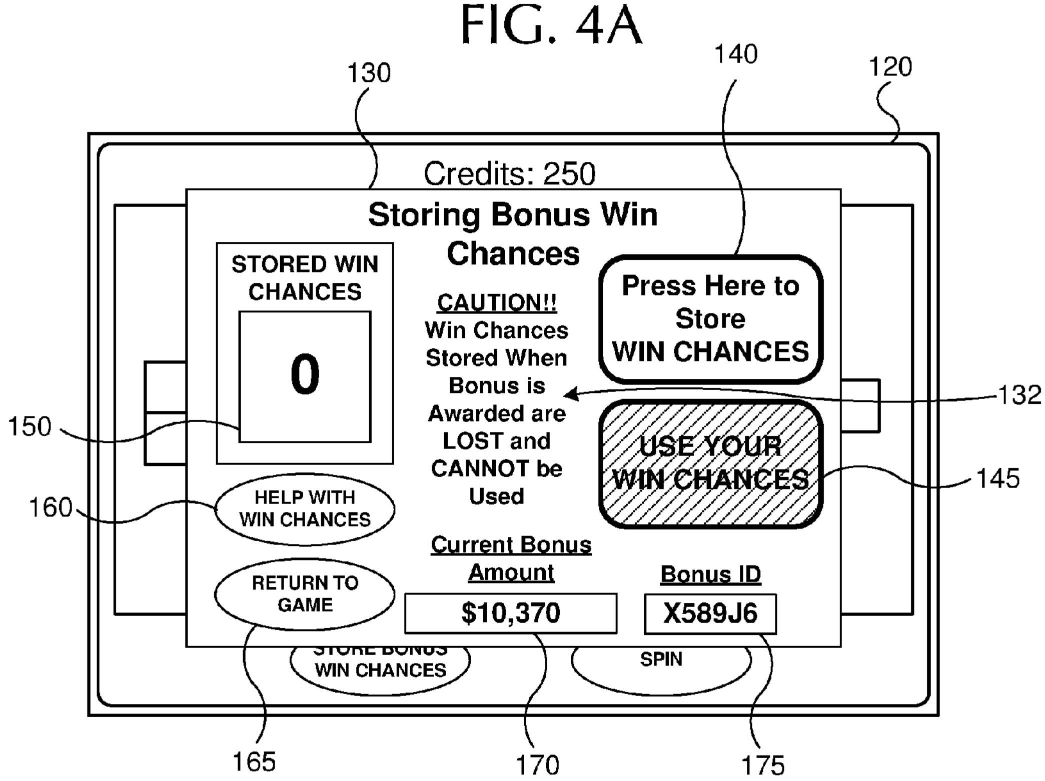
FIGS. 4B and 4C are detail diagrams of the player interface display of FIG. 4A showing an exemplary win chance storing screen according to embodiments of the invention.

FIG. 4B is a detail diagram of the player interface display of FIG. 4A showing an exemplary win chance storing screen according to embodiments of the invention. Referring to FIG. 4B, the player has pressed the win chance storing button 128 shown in FIG. 4A to bring up a win storing screen 130. The win storing screen 130 shows the number of win chances stored 150, the current bonus amount 170, and the current bonus ID 175. The win storing screen may also display a warning 132 that informs and cautions a player that any stored win chances not used when a bonus is won will be forfeited and lost. A help button 160 is also present to allow a player to gain additional information about storing and using win chances. Since storing win chances may be considered an advanced gaming topic, the default setting on all gaming devices may be set so that earned win chances are immediately used as is typically done in conventional gaming To activate the storing of win chances, a player may have to press the win chance storing button 140. Since no win chances are currently stored on the win chance storage meter 150, the win chance use button 145 is deactivated. The win storing screen 130 also includes a return or back button 165 to allow players to return to their normal game.

Figure 4C:
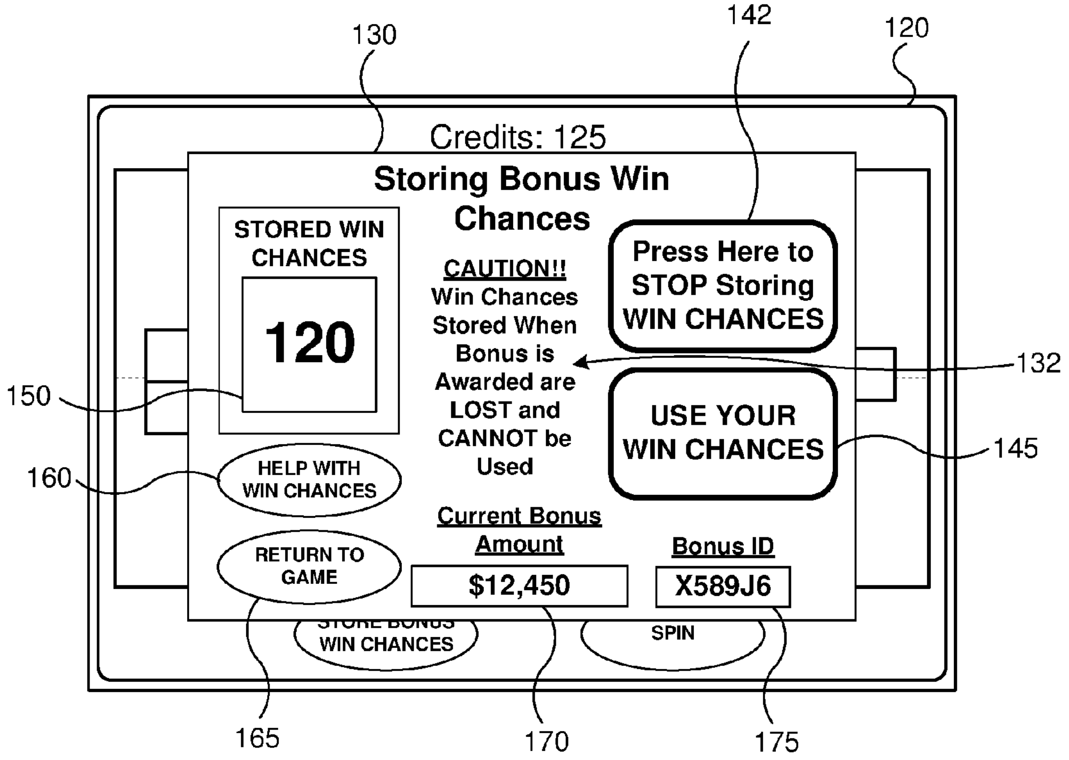

FIG. 4C is another detail diagrams of the player interface display of FIG. 4A showing an exemplary win chance storing screen according to embodiments of the invention. Referring to FIG. 4C, the player has now played at the gaming device for a while and while she has lost about half of her credits, she has stored up 120 win chances as shown on the win chance meter 150. Since the player has accumulated stored win chances, the win chance use button 145 is no longer disabled, and may be pressed to allow the player to use some or all of her stored win chances. Additionally, the win chance storing activation button 140 shown in FIG. 4B has now been replaced by a win chance storing deactivation button 142, which allows the player to keep her stored win chances and revert to having any future win chances being tested immediately, when earned, against the trigger criterion for the linked jackpot. Using this option may be useful, for example, if the player has stored a number of win chances, but feels that the linked jackpot may be triggered soon and wants to continue playing the gaming device.

Figure 4D:
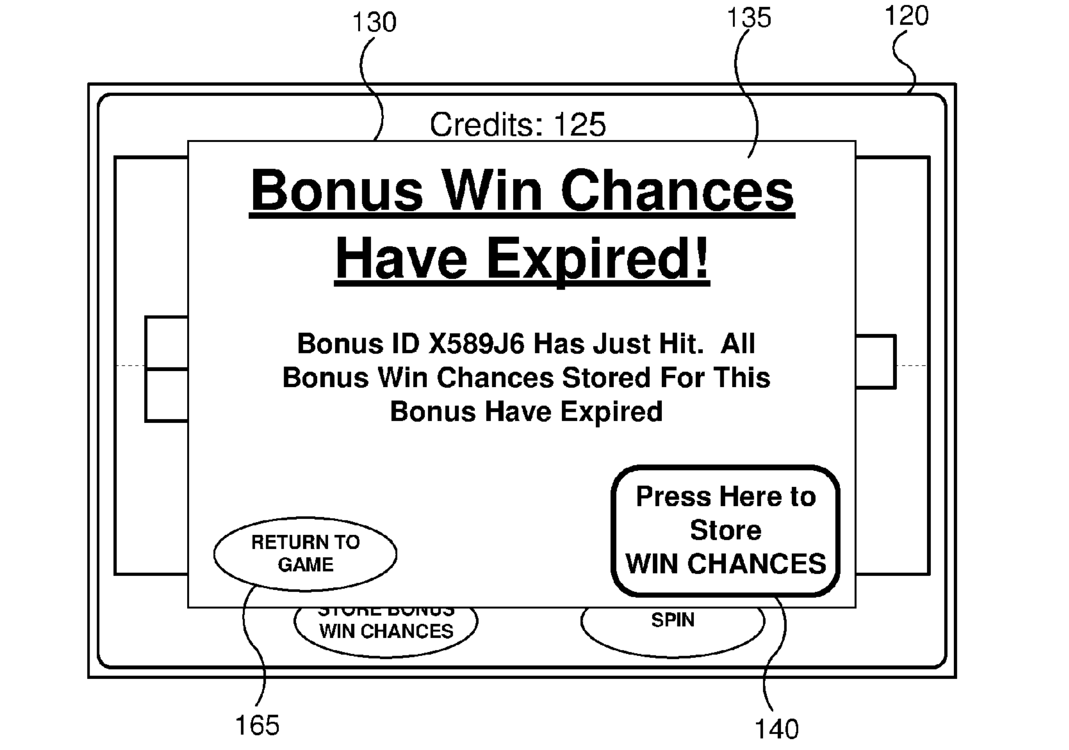
FIG. 4D is a detail diagram of the player interface display of FIG. 4A showing a win chance expiration message according to embodiments of the invention.

FIG. 4D is a detail diagram of the player interface display of FIG. 4A showing a win chance expiration message according to embodiments of the invention. Referring to FIG. 4D, the linked jackpot referred to in FIGS. 4B and 4C (Bonus ID X589J6) has been awarded. Thus, any stored win chances that have not been used immediately expire. In the present embodiment, any active gaming device with stored win chances, such as the gaming device 100 of our example player, immediately displays a win chance expiration screen 135 informing the players that their stored win chances have expired. This expiration screen 135 may be presented after any current gaming event to prevent interruption of play. For players that have stored win chances, but are not currently on a gaming device, the expiration screen 135 may be presented to them in response to the next time they identify themselves to the gaming system. In other embodiments, the expiration screen 135 may not be presented to players until they check their stored win chances if they are not currently saving win chances when the linked jackpot is triggered.

FIGS. 5A, 5B, 5C, and 5D are detail diagrams of the player interface display of FIG. 4A showing a win chance redemption screen according to embodiments of the invention.

Figure 5A:
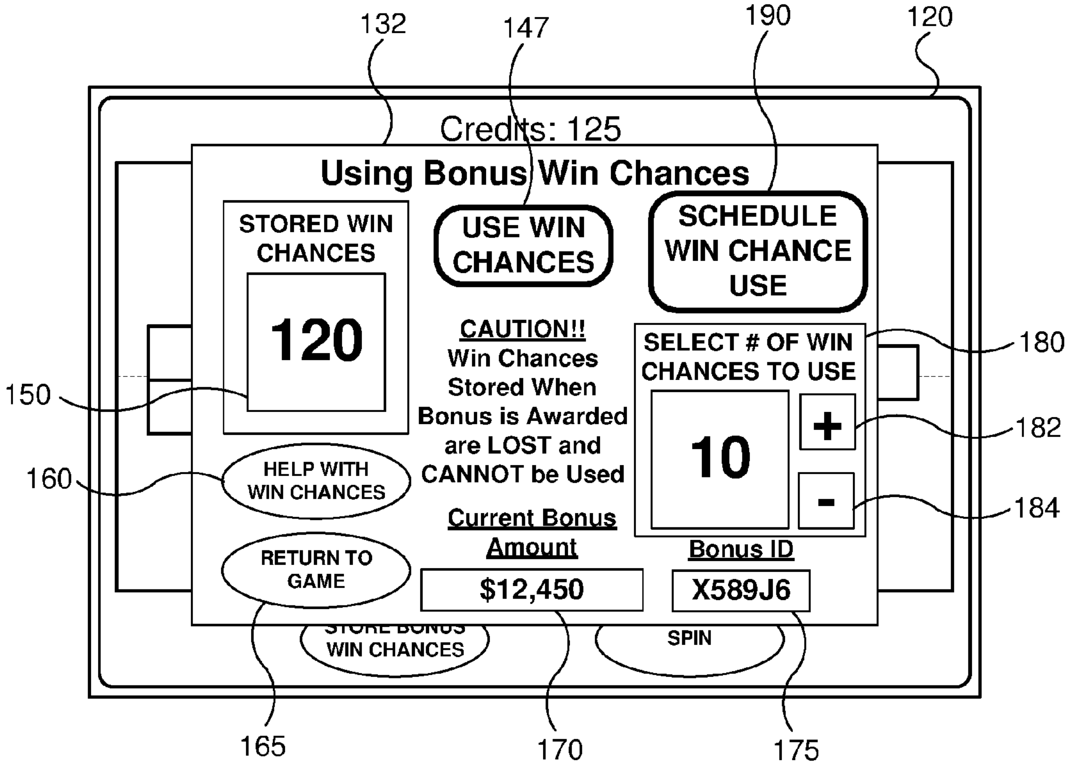
FIG. 5A is a detail diagram of the player interface display of FIG. 4A showing a win chance redemption screen according to embodiments of the invention.

Referring to FIG. 5A, a player has selected the win chance use button 145 (FIG. 4C) to bring up a win chance use or redemption screen 132. The win chance use screen includes a win chance selection box 180 where a player can select how many win chances to use. The player may use up to the number of stored win chances shown in the stored win chance meter 150. The win chance selection box may include an incrementing button 182 and a decrementing button 184 to allow a player to select a desired number of win chances to use. In addition, or alternatively, the player may touch the win chance selection box 180 to bring up a numeric keypad (not shown) where a player can directly enter the number of win chances to use. After the player has selected a desired number of win chances to use in the win chance selection box 180, the player can press the win chance activation or use button 147 to instruct the gaming system that the player is using the specified number of stored win chances. Alternatively, the player can use the win chance scheduling button 190 to schedule when stored win chances are to be used. This option is shown below the following figures.

Figure 5B:
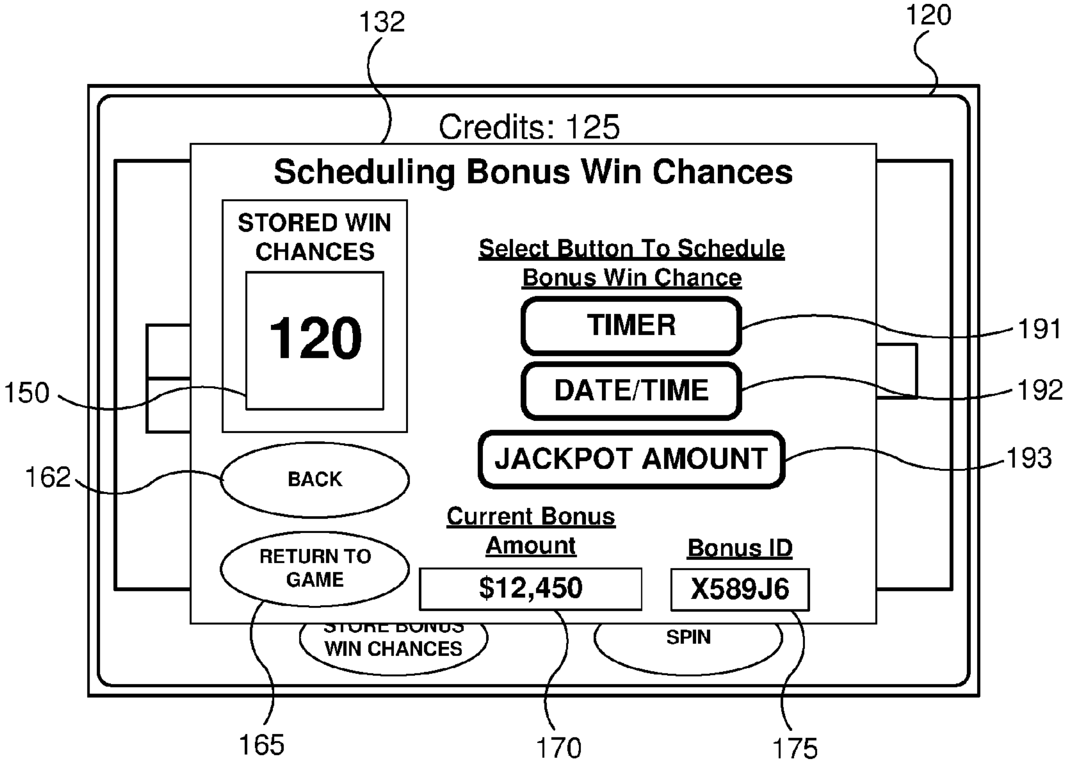
FIGS. 5B, 5C, and 5D are detail diagrams of the player interface display of FIG. 4A showing a win chance redemption scheduling screen according to embodiments of the invention.

Referring to FIG. 5B, the player has chosen to schedule one or more uses of her stored win chances. Here the win chance use screen 132 has been reconfigured to provide several types of scheduling options for the win chance uses. Illustrated in the embodiment shown in FIG. 5B are a timer scheduling button 191, a date/time scheduling button 192, and a jackpot amount scheduling button 193. The time scheduling option allows the player to enter a value in a countdown timer until the win chances are used. For example, if the player feels like the linked jackpot will hit in an hour, but has a business meeting to attend at that time, the player may use the timer scheduling option to instruct the gaming system to use a specified number of win chances on the player's behalf in one hour's time. The date/time option allows the player to specify a date and time to use the win chances. The jackpot amount option allows the player to specify that the win chances will be used when the linked jackpot amount reaches a certain amount threshold. Although only three scheduling options are shown in this embodiment, many other various scheduling options exist and may be implemented in other embodiments.

Figure 5C:
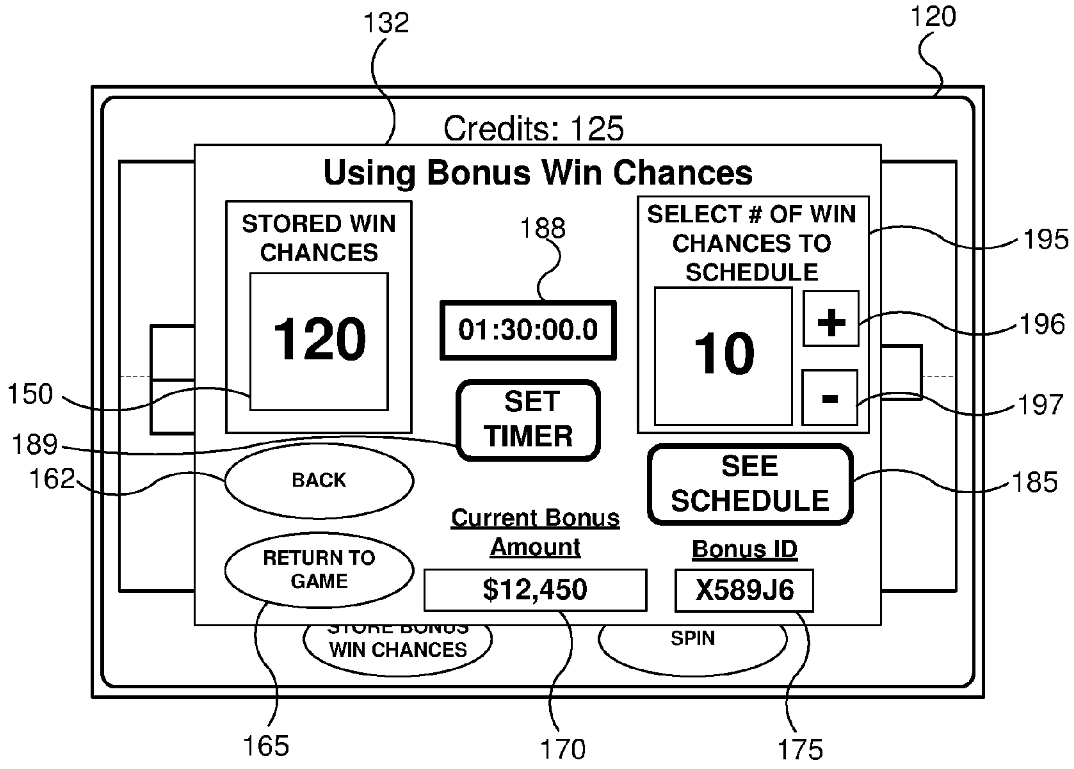

Referring to FIG. 5C, a player has selected the timer win chance scheduling option by pressing the timer scheduling button 191. This, in turn, brings up a win chance schedule selection box 195 with an incrementing button 196 and decrementing button 197 to allow a player to select a number of win chances to schedule. A timer display 188 and a timer setting button 189 may be used to set a timer to a desired value. Here, the player has selected a timer value of one hour and thirty minutes. The player may also press the see schedule button 185 to see all of the player's currently scheduled win chance uses.

Figure 5D:
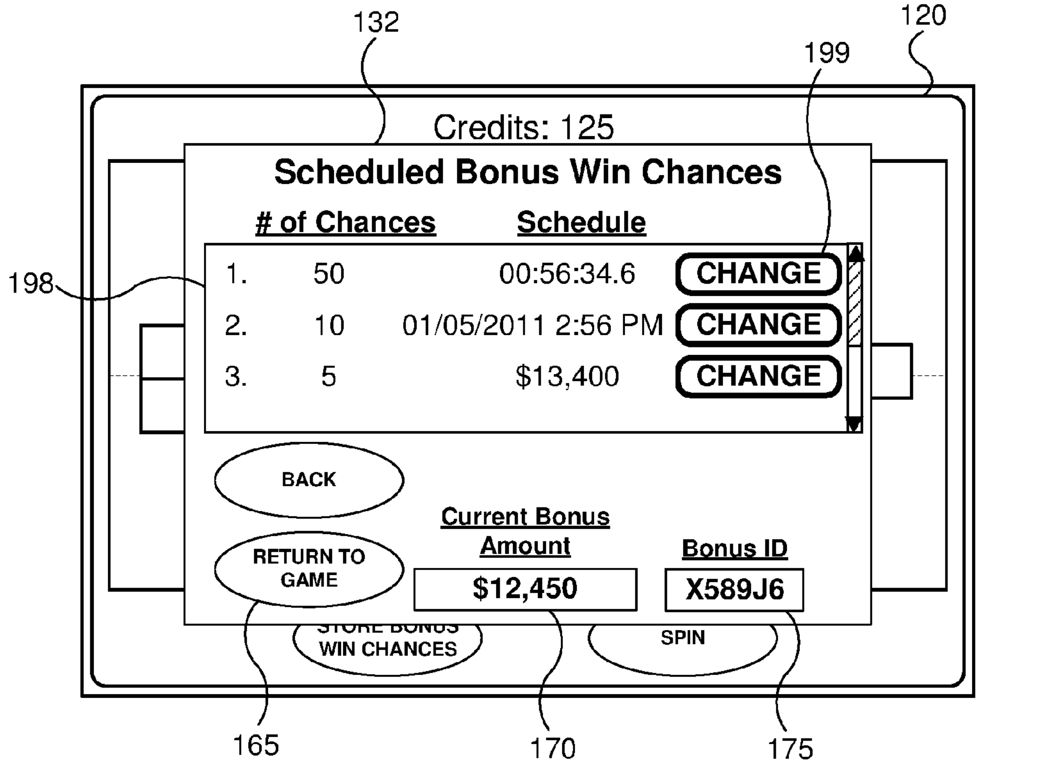

Referring to FIG. 5D, a player has selected the see schedule button 185 and has brought up a schedule list 198 showing three win chance uses that the player has scheduled. The first scheduled win chance use is a based on a timer option and will use fifty win chances in just over fifty six minutes. The second scheduled win chance use is to occur on Jan. 5, 2011 at 2:56 in the afternoon where 10 win chances will be used. This second scheduled win chance is based off of the date/time scheduling option. The third scheduled win chance use is based on the jackpot amount scheduling option and is configured to use five win chances when the linked jackpot amount reaches $13,400. Additionally, change buttons 199 are provided for each scheduled win chance to allow a player to update, chance, or delete the scheduled win chance use.

Although only some options and buttons are shown on each of the screens, in other embodiments, varying options and buttons may be implemented to provide for easy use by a player.

Figure 6:
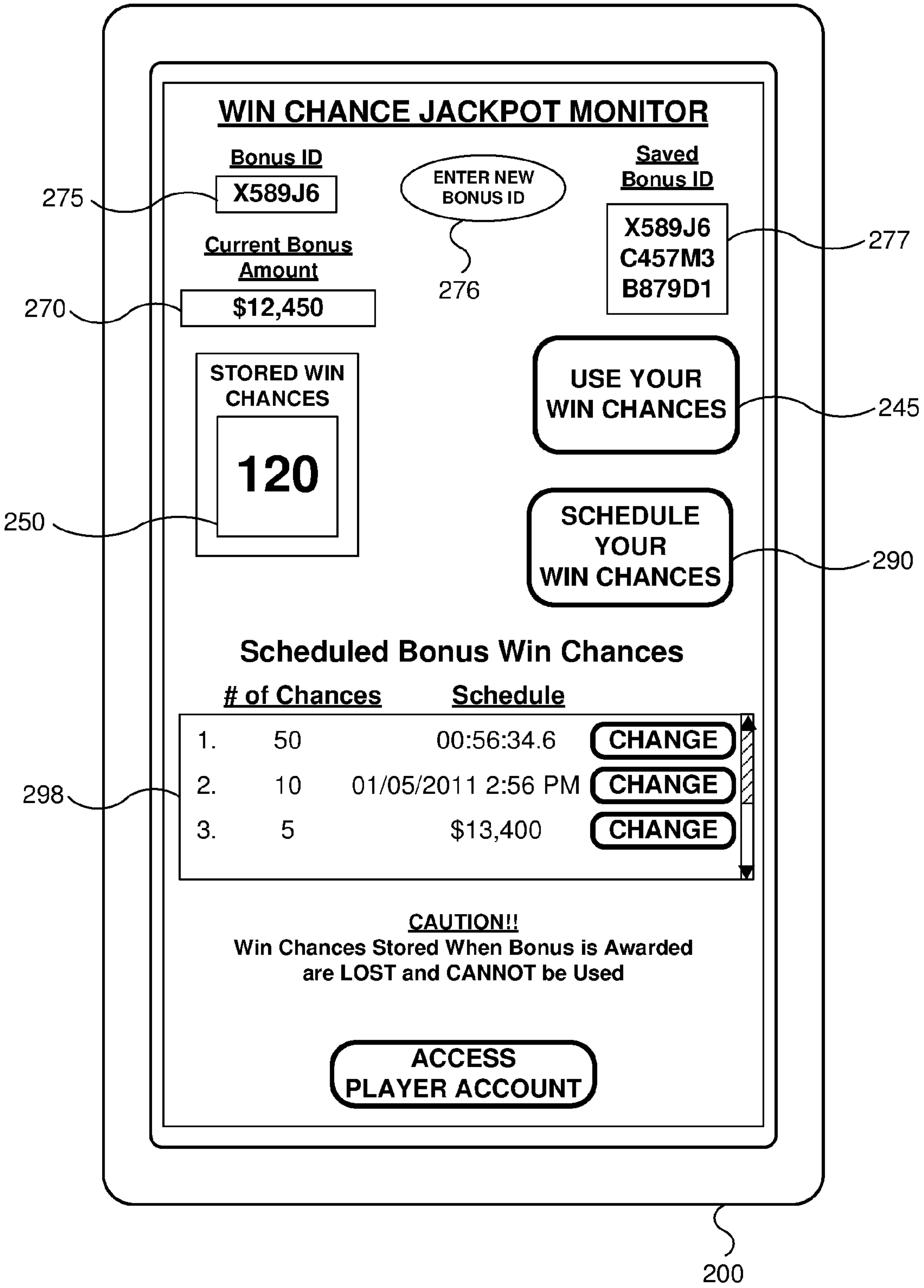
FIG. 6 is a detail diagram of a wireless device configured to monitor a jackpot according to embodiments of the invention.

FIG. 6 is a detail diagram of a wireless device configured to monitor a jackpot according to embodiments of the invention.

Referring to FIG. 6, a wireless device 200 is configured to include an application that allows a player to remotely monitor their stored win chances and related bonuses. In the embodiment illustrated in FIG. 6, the application on the wireless device displays current bonus identification 275, a current bonus amount 270, the number of win chances stored by the player 250, and a schedule table 298 showing the win chance uses scheduled by the player. These displays are similar to the ones described above. In addition to these displays, the application also shows other bonus IDs 277 where the player has saved win chances. The player may select another one of the bonus IDs to bring up all of the current information relating to that bonus. If one of the linked jackpots hits, the bonus ID list 277 may be updated to strike through the related bonus number or otherwise inform the player that their currently stored win chances relating to the that bonus have expired. The application further includes a new bonus ID button 276 where the player can enter a new bonus ID that they have recently played and stored win chances on. In some embodiments, the bonus ID list 277 may automatically update from information sent via the gaming network from the player club server about the new bonus; thus making the new bonus ID button 276 unnecessary.

The application also includes a win chance use button 245 and a win chance schedule button 290 to allow a player to use or schedule win chances for use on a currently shown bonus. These buttons operate in a similar manner to the ones described above (buttons 145 and 190) except that they are communicating through the application on the wireless device 200 rather than through gaming network lines connected to a gaming device. This wireless device allows players to continue to track and interact with their stored bonuses even after they have left the casino floor. Players can monitor jackpot amounts and decided when and if to use stored win chances that have been previously earned.

The wireless device 200 may be a personal cell phone, smart phone, laptop computer, or other personal electronic device capable of securely connecting to a gaming network. In other embodiments, the wireless device 200 may be a casino-issued wireless device that players may use will staying at a casino or gambling on their premises. Although a wireless device 200 is shown as a monitoring device in FIG. 6, the player may use various other monitoring devices besides game devices and wireless devices to monitor and interact with their stored win chances. For example, a player may access their stored win chances on a personal computer connected to the Internet, on a gaming kiosk on the casino floor, on a television in casino hotel room, or on other electronic devices that can connect to the gaming network.

By allowing players to monitor and manage their win chances from a remote device, casinos allow players to actively participate in a gaming experience even when not situated at a gaming device. For example, a player may choose to store their win chances for a large jackpot during a weekend trip to Las Vegas because a large linked-jackpot had recently been won. Upon arriving at home, the player may periodically check their computer or cell phone to see how high the award amount has climbed for the large jackpot. The casino may even send periodic updates to the player (or all players having stored win chances) of the bonus amount and the player's current number of stored win chances. These updates may be occur when the jackpot reaches, certain values, or at periodic time intervals. Here, even though it may be days after the player's visit, the player may still be actively participating in her gaming sessions. By extending these gaming sessions, casinos may provide a player a longer and more satisfying gaming experience.

Monitoring abilities may also be categorized into several different levels offered to various players. For example, casinos may offer a more detailed monitoring package to certain players, such as high-rollers or players that pay a monitoring fee. Enhanced monitoring abilities may include the ability to look at statistics of past jackpots, such as when they were awarded or at what amounts they were awarded. These enhanced features may help a player in selecting when to use her win chances. In addition, enhanced monitoring packages may include advanced applications to manage win chances, such as including additional scheduling options or having a more user-friendly interface.

Various embodiments of gaming devices, gaming systems, and monitoring devices have been described above to provide example details about how hardware devices may be configured and modified to implement aspects of this concept. Now, several embodiments of methods of operating a gaming system to provide stored win chances and delayed win determinations will be described.

Figure 7:
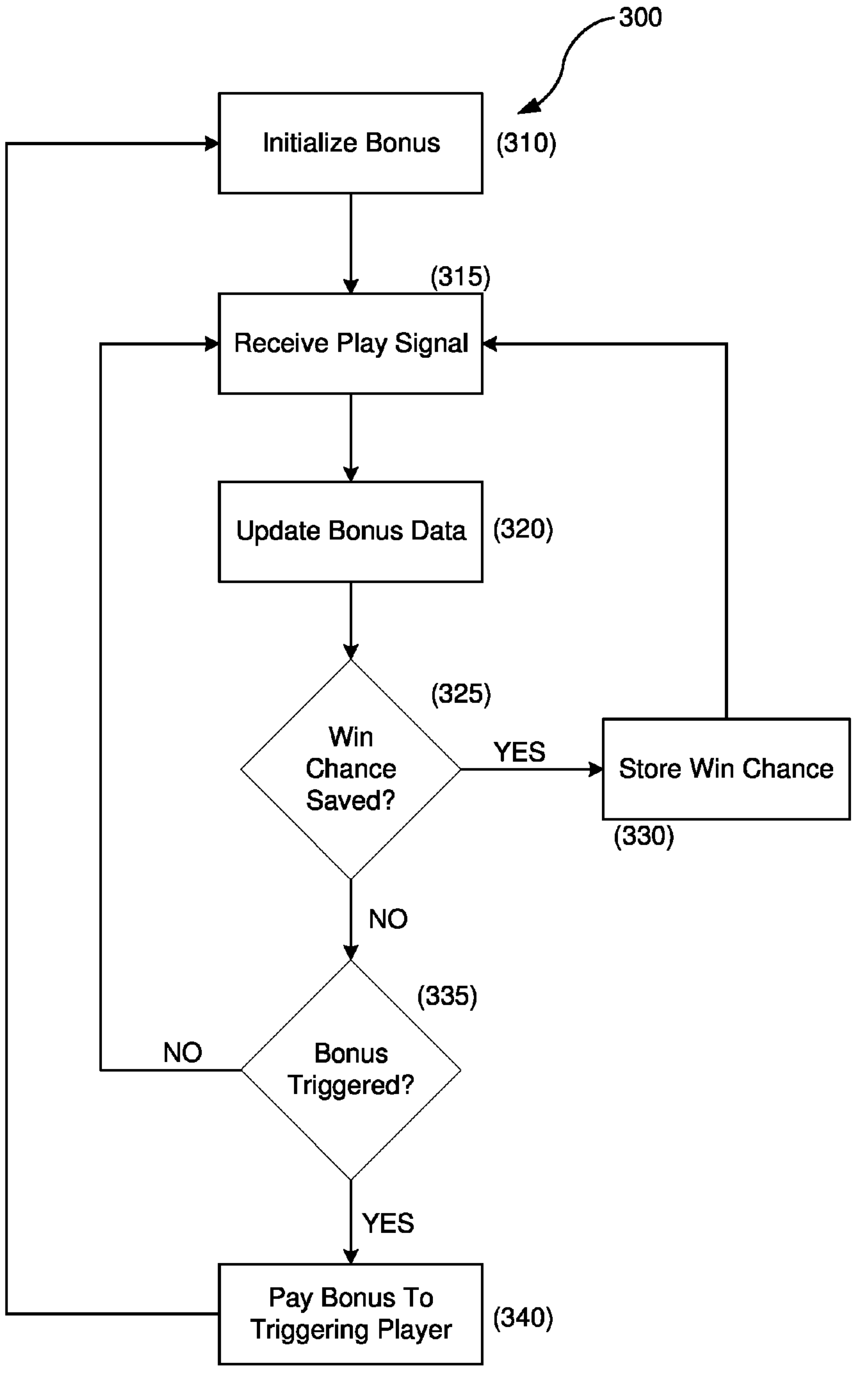
FIG. 7 is a flow diagram of a method of operating a gaming system having a linked jackpot according to embodiments of the invention.

FIG. 7 is a flow diagram of a method of operating a gaming system having a linked jackpot according to embodiments of the invention. Referring to FIG. 7, flow 300 begins by initializing the linked jackpot in process 310. As discussed above, this initialization process may be carried out by a bonus server or controller (such as server 80 in FIG. 3). During the initialization process 310, the bonus amount is reset to a predefined value or a value from a predefined range of initial bonus values. For example, a bonus controller 80 may randomly select an initial bonus value from the range of 1000 to 5000 credits. In addition, all bonus data is reset to initial values in process 310. That is, a bonus count or other bonus progress measuring metric is reset to an initial value. If the linked jackpot is a mystery type bonus where a defined trigger point is determined prior to operation of the bonus cycle, process 310 includes selecting the trigger point for the bonus, thereby defining some of the parameters of the bonus cycle.

Once the bonus is initialized in process 310, flow 300 moves on to process 315 whereby the bonus controller waits until it receives a play signal from one of the connected gaming devices. Here, the received play signal indicates that a qualifying wager and game initiating input has been received on the connected gaming device. Qualifying wagers/game initiating inputs are those wagers/initiating inputs that affects bonus data. For example, in some embodiments a one coin wager on a gaming device does not contribute to a linked jackpot, nor does it make the gaming device eligible to receive the linked jackpot. The one coin wager in this example would not be a qualifying event since it has no effect on the bonus data. Conversely, any wager/initiating input that does have an impact of the bonus would be a qualifying signal.

Once it has been determined that a qualifying play signal has been received in process 315, flow 300 moves to process 320 where the bonus data is updated in response to the play signal received in process 315. Here, for example, any contribution provided from the wager on the game device may be added to the bonus amount. The bonus amount displayed on a bonus display may further be updated to show the new value of the bonus. In process 325, the bonus controller then determines whether the player associated with the received play signal has chosen to save the win chance associated with the wager/initiating input. If the bonus controller determines that the player has chosen to save her win chance, flow 300 moves to process 330, where the win chance for the player is stored. In some embodiments, process 330 may include notifying the gaming device from which the play signal is received that the win chance should be stored. In other embodiments, process 330 may include notifying a player club server that a win chance for an identified player should be stored in the player account associated with the identified player. At the completion of process 330 flow 300 returns to process 315 to await another play signal for the same or different connected gaming device.

If, on the other hand, it is determined in process 325 that the player has not chosen to save her win chances, flow 300 proceeds to process 335 where it is determined whether the linked jackpot has been triggered. In some embodiments, process 335 may update a bonus count or other bonus progress measuring metric and then determine if the new bonus count or metric meets a predefined bonus-triggering condition. In other embodiments, process 335 may include selecting a random number and determining if the random number meets a triggering criterion for the linked jackpot. If it is determined that the linked jackpot bonus has not been triggered in process 335, flow 300 proceeds back to process 315 to await another play signal. If it is determined that the linked jackpot bonus has been triggered in process 335, flow 300 proceeds to process 340 where the linked jackpot bonus amount is paid to the triggering player at the gaming device from which the play signal was received. After the linked jackpot has been paid in process 340, flow 300 returns to process 310 where another bonus is initialized.

Flow 300 illustrates an example method of operating a gaming device, and includes the processes of storing win chances if so chosen by a player. Assuming a player does store her win chances, another operational method is needed to allow the player to use her stored win chances. One example method of operating a gaming system to allow a player to use his or her win chances is illustrated in FIG. 8, which is discussed below.

Figure 8:
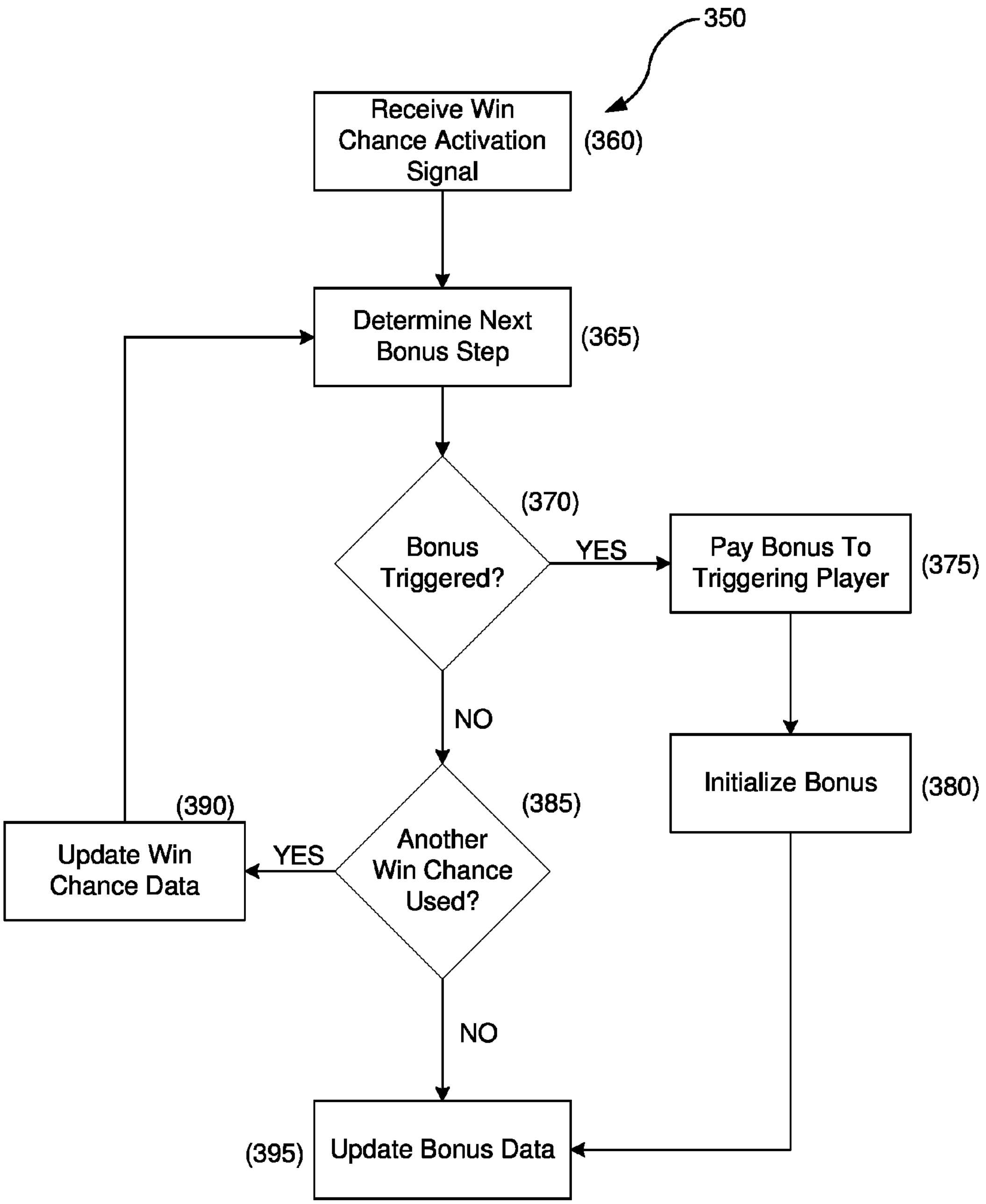
FIG. 8 is another flow diagram of a method of operating a gaming system having a linked jackpot according to embodiments of the invention.

FIG. 8 is a flow diagram of a method of operating a gaming system having a linked jackpot according to embodiments of the invention. Referring to FIG. 8, flow 350 begins when a bonus controller receives a signal that a player wants to use some or all of their stored win chances in process 360. The signal received by the bonus controller may be generated when a player activates a win chance use button (such as button 145 in FIGS. 4C, 5A or button 245 in FIG. 6) or automatically from a remote server or connected memory when a scheduled win chance becomes activated. In either scenario, flow 350 proceeds to process 365 where the bonus controller determines the next bonus step. In some embodiments, process 365 includes incrementing a bonus count or updating a bonus progress measuring metric. In other embodiments, process 365 includes selecting a random number from a range of numbers.

After the next bonus step has been determined in process 365, flow 350 moves to process 370 where the bonus controller determines if the linked jackpot bonus has been triggered. In some embodiments, process 370 includes determining if the updated bonus count or progress measuring metric meets a predefined bonus trigger value. In other embodiments, process 370 includes comparing the randomly selected number to see if it matches a bonus triggering criterion.

If it is determined that the bonus has been triggered in process 370, flow 350 proceeds to process 375 where the bonus amount is paid to the player that either activated a win chance use button or to the player associated with the scheduled win chance activation. If the player is not currently playing a gaming device, the bonus controller may notify a player server and/or casino personnel of the bonus win so that the player will be notified of their bonus win. After the bonus has been paid to or reserved for a triggering player, flow 350 proceeds to process 380 where the bonus is initialized. Process 380 may include similar steps to process 310 described above with respect to FIG. 7. After the bonus has been initialized in process 380, flow 350 proceeds to process 395 where any bonus data can be updated.

If it is determined that the bonus has not been triggered in process 370, flow 350 proceeds to process 385 where the bonus controller determines if another win chance has been specified to be used. If for example, the player has requested that ten win chances be used and the first win chance does not result in the bonus win being triggered, process 385 would determine that nine additional win chances are still to be used. If two (or more players) request that their win chances be used at overlapping times, the bonus controller may be configured to cycle through a first players win chances entirely before moving on to the second player's win chances, or the bonus controller may be configured to cycle through one of the first person's win chances and then one of the second person's win chances in an alternating fashion until the bonus has been triggered or all of the win chances have been used. This alternating win chance handling embodiment is not illustrated, but uses similar processes to those illustrated in FIG. 8. In other embodiments, the bonus controller may randomly select which win chance is used from the players, or the bonus controller may determine which player is given initial priority based on a player-rating determination.

To better illustrate these different embodiments consider the following example where Player A and Player B each wish to use some of their win chances at substantially the same time or overlapping times, with Player A using 10 win chances and Player B using 20 win chances. In one embodiment, if Player A either made a win chance redemption input a split second sooner than Player B or scheduled the use of the win chance earlier than Player B, each of Player A's win chances would be used prior to using any of Player B's win chance. In another embodiment, the bonus controller may randomly select Player B as the player to go first. Here, the bonus controller may direct the win chances to be all be used for Player B first, or may initiate an alternating sequence, such as B, A, B, A, etc. until all of Player A's win chances had been used. With this embodiment, the bonus controller may weight this random selection based on the number of win chances being used, determined player value, or on another criterion.

In another embodiment, the bonus controller may randomly select which player's win chance will be used for each win chance use. Here, there would be a pool of 30 win chances (10 for Player A and 20 for Player B), which is weighted toward Player B based on the number of win chances she is using. A win chance use sequence might look something like B, A, B, B, B, A, A, B, etc. in this embodiment. Alternatively, the bonus controller may equally weight each player regardless of bonus chances used for each win chance use selection. That is, each player would have a 50% chance of having their win chance used next.

In yet another embodiment, the bonus controller may select which win chance to use next based off of a determination of player value. That is, one player may be given priority over another player in response to predefined player-value criteria. The player given a higher priority may have their win chances used first, or may be given a preferential weighting before randomly selecting which win chance to use next. In the above example, suppose Player A is determined to have a higher player value than Player B. Here, all of Player A's win chances may be used prior to Player B's win chances, or Player A's chances may, for example, be given triple weighting. Thus, Player A's 10 win chances may be given a pool weight of 30 versus the 20 win chances for Player B in a total selection pool of 50.

The predefined player-value criteria may include determinations of which player has wagered more during a current gaming session, which player is more loyal, which player typically spends more during a visit to the casino, which player may be more valuable as a long-term customer, etc. Alternatively, the predefined player-value criteria may focus on player value from a maintaining-game-play stance. For example, if Player B has not won a significant award as recently as Player A, Player A may be chosen to have her win chances used first. The above examples are discussed with respect to two players, but similar methods may be used for situations including three or more players. There are of course many variations in selecting player-value criteria, as well as in methods of determining the order of using win chances. All of these variations are contemplated and fall within the scope of this concept.

If it is determined that another win chance has been specified in process 385, flow 350 proceeds to process 390 where the win chance data is updated. In the above example where ten win chances were specified to be used and the first win chance did not trigger the bonus process 390 discards the initial win chance and moves to the second win chance of the ten specified win chances to see if this win chance triggers the linked jackpot. After the win chance data has been updated in process 390, flow 350 returns to process 365 where the next bonus step is again determined. If it is determined that another win chance has not been specified in process 385, flow 350 proceeds to process 395 where any updates to the bonus data are carried out.

The following example is provided to convey certain characteristics of this concept. However, this example may include only certain characteristics of certain embodiments of the concept and the scope of the concept is not limited to either the above illustrated embodiments or to the features of the following example. In this example a linked jackpot award trigger value is randomly selected between the numbers 1 and 100. In this example, it is selected as the number "64." Table 1 below illustrates example game sessions for players A, B, and C who are all playing gaming devices connected to the linked jackpot, and are the only players currently playing on gaming devices connected to the jackpot. The linked jackpot starts at a value of 1000 and is incremented by a value of two for each five credit wager placed on each gaming device. Each of lines indicates a gaming event completed by each player, where "SWC" stands for stored win chances and "UWC" stands for used win chances.

TABLE 1

| | Player A | Player B | Player C | Bonus Value | Bonus Count |
|---|---|---|---|---|---|
| Start | No SWC | No SWC | No SWC | 1000 | 0 |
| 1 | 1 SWC<br>0 UWC | 0 SWC<br>1 UWC | 1 SWC<br>0 UWC | 1006 | 1 |
| 2 | 2 SWC<br>0 UWC | 0 SWC<br>1 UWC | 2 SWC<br>0 UWC | 1012 | 2 |
| 3 | 3 SWC<br>0 UWC | 0 SWC<br>1 UWC | 3 SWC<br>0 UWC | 1018 | 3 |
| 4 | 4 SWC<br>0 UWC | 0 SWC<br>1 UWC | 3 SWC<br>1 UWC | 1024 | 5 |
| . . . | . . . | . . . | . . . | . . . | . . . |
| 40 | 40 SWC<br>0 UWC | 0 SWC<br>1 UWC | 30 SWC<br>0 UWC | 1240 | 50 |
| 41 | 41 SWC<br>0 UWC | 0 SWC<br>1 UWC | 20 SWC<br>11 UWC | 1246 | 62 |
| 42 | 42 SWC<br>0 UWC | 0 SWC<br>1 UWC | 10 SWC<br>11 UWC | 1252 | 74<br>WINNER |
| 43 | 1 SWC<br>0 UWC | 0 SWC<br>1 UWC | 1 SWC<br>0 UWC | 1006 | 1 |
| 44 | 2 SWC<br>0 UWC | 0 SWC<br>1 UWC | 1 SWC<br>1 UWC | 1012 | 3 |

Here, player A has stored every one of their win chances through each of the games. Player B, on the other hand, has chosen to not store any of their win chances, while player C chooses to store some win chances and use them periodically. The bonus amount goes up with each game because all three players are contributing two credits per play to the linked jackpot amount. The bonus count, however, only increases when the players use their bonus chances. Thus, at game 40 the bonus count has only progressed to a count of fifty even though a total of 120 bonus chances have been awarded to the players. This is because players A and C have stored some of their win chances. Player C decides to use some of her win chances in games 41 and 42. In game 41, the 11 win chances used by player C (and the one win chance used by player B) kicks up the win count to 62, but does not trigger the linked jackpot. However, in game 42 the 11 win chances used by player C pushes the bonus count passed the trigger value of 64 and awards the linked jackpot bonus to player C. In game 43, all of player A's stored win chances have expires and his win chance meter is reset to zero, or one after the completion of game 43. The lined jackpot amount is also reset to 1000 credits and the bonus count is reset to zero. In addition, another bonus trigger value is selected to be used to determine when a subsequent linked jackpot will be awarded.

Some embodiments of the invention have been described above, and in addition, some specific details are shown for purposes of illustrating the inventive principles, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a gaming system having a plurality of gaming devices connected to a linked jackpot, the method comprising:

permitting a plurality of players to play the gaming devices;

generating play signals at the gaming devices responsive to play by the players;

updating an amount of the linked jackpot based on the received play signals;

generating a chance to determine a number that awards the jackpot when the determined number corresponds to a predefined trigger number, the chance being generated responsive to the play signal;

storing the chance generated responsive to the play signal when it is determined that a player has chosen to store chances;

associating the stored chance with the player whose gaming device generated the play signal;

displaying the updated amount of the linked jackpot and the number of associated stored chances for one of the players on a wireless mobile device carried by the one player;

activating at least one of the stored chances for the one player responsive to player operation of an actuator on the wireless mobile device carried by the one player; and determining if the number determined by the activated chance corresponds to the predefined trigger number for the linked jackpot.

2. The method of claim 1, wherein the chance is stored in a player account database when the player is an identified player.

3. The method of claim 1, further comprising deleting all stored chances associated with the linked jackpot when it is determined that an implemented chance meets the trigger number for the linked jackpot.

4. The method of claim 1, wherein activating the at least one stored chance further comprises incrementing a bonus count and comparing the bonus count to the trigger number.

5. The method of claim 1, wherein activating the at least one stored chance further comprises selecting a random number and comparing the random number to the trigger number.

6. The method of claim 1, wherein the predefined trigger number is contained within a range of numbers and wherein implementing a chance comprises advancing a count toward the predefined trigger number.

7. The method of claim 1, wherein the predefined trigger number is contained within a range of numbers and wherein implementing a chance comprises generating at least one randomly selected number within the range of numbers.

8. The method of claim 1, wherein implementing a chance comprises activating the stored chance responsive to a chance activation signal.

9. The method of claim 8, further comprising awarding the current linked jackpot amount when the activated chance coincides with the predefined trigger number.

10. A method of operating a gaming system having a plurality of gaming devices connected to a linked jackpot that accumulates responsive to play signals from the gaming devices, the method comprising:

generating at least one chance to determine a number that awards the jackpot responsive to each play signal;

storing the at least one chance;

associating the stored at least one chance with a player whose gaming device sent the play signal that generated the at least one chance;

displaying a current amount of the linked jackpot on a wireless mobile device carried by the player;

displaying the number of stored chances associated with the player on the wireless mobile device;

receiving a chance activation signal responsive to an input at the mobile computing device initiated by the player;

activating a stored chance responsive to the activation signal to determine a number;

determining if the determined number corresponds to a predefined trigger number for the linked jackpot;

repeating the steps of activating the stored chance and determining if the determined number corresponds to the predefined trigger number when it is determined that a currently determined number does not meet the predefined trigger number for the linked jackpot; and awarding the jackpot when it is determined that a currently determined number meets the predefined trigger number.

11. The method of claim 10, wherein receiving a chance activation signal includes receiving a signal from one of the gaming devices that a player has requested the use of at least one stored chance.

12. The method of claim 10, wherein receiving a chance activation signal includes receiving a signal from a scheduling server indicating that at least one chance associated with an identified player be used.

13. The method of claim 10, wherein the predefined trigger number is contained within a range of numbers and wherein determining the number that awards the jackpot when the determined number corresponds to a predefined trigger number comprises advancing a count toward the predefined trigger number.

14. The method of claim 10, wherein the predefined trigger number is contained within a range of numbers and wherein determining the number that awards the jackpot when the determined number corresponds to a predefined trigger number comprises generating at least one random number within the range of numbers.

15. A method of operating a gaming device having a jackpot award, the method comprising:

receiving a game play signal;

updating an amount of the jackpot based on the received game play signal;

storing a win chance associated with the game play signal when it is determined that a player has chosen to store win chances;

displaying a current amount of the jackpot on a wireless mobile device carried by a player of the gaming device;

displaying the number of stored win chances associated with the player on the wireless mobile device;

receiving a chance activation signal responsive to an input at the mobile computing device initiated by the player; and implementing a win chance and determining if the win chance meets a trigger criterion for the jackpot responsive to receipt of the chance activation signal.

16. The method of claim 15, further comprising implementing a stored win chance and determining if the stored win chance meets a trigger criterion for the linked jackpot when a win-chance activation signal is received.

17. The method of claim 15, further comprising associating a player identifier with a stored win chance when it is determined that player has chosen to store win chances.

* * * * *